United States Patent
Salpekar et al.

(10) Patent No.: US 9,405,709 B1
(45) Date of Patent: Aug. 2, 2016

(54) SYSTEMS AND METHODS FOR PERFORMING COPY-ON-WRITE OPERATIONS

(71) Applicant: Symantec Corporation, Mountain View, CA (US)

(72) Inventors: Ajay Salpekar, Hayward, CA (US); Balemurughan Kumaresan, Cupertino, CA (US); Darshan Joshi, Fremont, CA (US)

(73) Assignee: Veritas Technologies LLC, Mountain View, CA (US)

( * ) Notice: Subject to any disclaimer, the term of this patent is extended or adjusted under 35 U.S.C. 154(b) by 273 days.

(21) Appl. No.: 13/672,626

(22) Filed: Nov. 8, 2012

Related U.S. Application Data

(60) Provisional application No. 61/682,431, filed on Aug. 13, 2012.

(51) Int. Cl.
| | | |
|---|---|---|
| *G06F 12/16* | (2006.01) | |
| *G06F 11/16* | (2006.01) | |
| *G06F 11/00* | (2006.01) | |

(52) U.S. Cl.
CPC ............... *G06F 12/16* (2013.01); *G06F 11/00* (2013.01); *G06F 11/16* (2013.01)

(58) Field of Classification Search
CPC ....................................................... G06F 12/16
USPC ........................................................ 711/162
See application file for complete search history.

(56) References Cited

U.S. PATENT DOCUMENTS

| | | | | |
|---|---|---|---|---|
| 2009/0024813 A1* | 1/2009 | Uysal | ................... | G06F 11/1471 711/162 |
| 2009/0300302 A1* | 12/2009 | Vaghani | ................ | G06F 3/0605 711/162 |
| 2013/0036091 A1* | 2/2013 | Provenzano et al. | ......... | 707/624 |
| 2013/0117505 A1* | 5/2013 | Fiske | ..................... | G06F 3/065 711/114 |

OTHER PUBLICATIONS

Liuba Shrira et al.; Thresher: An Efficient Storage Manager for Copy-on-Write Snapshots; Department of Computer Science, Brandeis University; As accessed on Sep. 5, 2012.
Bhavana Shah; Disk Performance of Copy-on-Write Snapshot Logical Volumes; University of British Columbia; As accessed on Sep. 5, 2012.
Nathan Bronson et al.; A Practical Concurrent Binary Search Tree; Stanford University; As accessed on Sep. 5, 2012.
Sanjay Kumar et al.; Systems and Methods for Creating Selective Snapshots; U.S. Appl. No. 13/291,692, filed Nov. 8, 2011.

\* cited by examiner

*Primary Examiner* — David X Yi
*Assistant Examiner* — Zubair Ahmed
(74) *Attorney, Agent, or Firm* — ALG Intellectual Property, LLC

(57) ABSTRACT

A computer-implemented method for performing copy-on-write operations may include (1) identifying a write operation addressed to at least a part of a storage area on a storage system, (2) determining that the storage area is configured to be copied before writing to the storage area in order to preserve original data stored within the storage area, (3) identifying an interface for offloading copy-on-write operations to the storage system, and (4) using the interface to instruct the storage system to create a copy of the storage area modified with the write operation. Various other methods, systems, and computer-readable media are also disclosed.

20 Claims, 6 Drawing Sheets ized data. Some of
SYSTEMS AND METHODS FOR PERFORMING COPY-ON-WRITE OPERATIONS

CROSS REFERENCE TO RELATED APPLICATION

This application claims priority to U.S. Provisional Application No. 61/682,431, titled "Optimized copy-on-write snapshots by unsharing shared regions" and filed 13 Aug. 2012, the disclosure of which is incorporated, in its entirety, by this reference.

BACKGROUND

In the digital age, organizations increasingly generate and use large amounts of digitally-stored data. These organizations may use increasingly complex information technology infrastructures to manage their digitally-stored data. Some of these information technology solutions may utilize copy-on-write operations.

Copy-on-write operations may create a copy of data before the data is overwritten and/or modified in order to preserve the data in its original form. For example, a deduplication system may store a single instance of a file on behalf of multiple users instead of a separate copy of the file for each user. If one user wishes to modify the file, the deduplication system may apply a copy-on-write operation to preserve the file in its original form for the remaining users. As another example, a backup system may take a snapshot of a volume to back up. In this example, instead of copying the entire volume before allowing any write operations on the volume, the backup system may use copy-on-write operations to both preserve the volume in its state at the time of the snapshot as well as allow ongoing modifications to the volume.

Unfortunately, copy-on-write operations may consume a significant amount of computing resources (e.g., reading the data to be copied and writing the data to be copied in addition to the cost of performing the actuating write operation). Some traditional systems that employ copy-on-write operations may use large minimum chunk sizes for copy-on-write operations (e.g., copying a one megabyte chunk when a write operation is directed to a location within the one megabyte chunk) even though some write operations may be significantly smaller than the minimum chunk size (e.g., a write operation modifying a four kilobyte block). The use of copy-on-write operations may therefore multiply the cost of small write operations. Accordingly, the instant disclosure identifies and addresses a need for additional and improved systems and methods for performing copy-on-write operations.

SUMMARY

As will be described in greater detail below, the instant disclosure generally relates to systems and methods for performing copy-on-write operations by offloading copy-on-write operations to storage systems (e.g., with native capacities to perform copy-on-write operations) through copy-on-write interfaces.

In one example, a computer-implemented method for performing copy-on-write operations may include (1) identifying a write operation addressed to at least a part of a storage area on a storage system, (2) determining that the storage area is configured to be copied before writing to the storage area in order to preserve original data stored within the storage area, (3) identifying an interface for offloading copy-on-write operations to the storage system, and (4) using the interface to instruct the storage system to create a copy of the storage area modified with the write operation.

In some examples, the storage area may be larger than the size of the write operation. In some embodiments, determining that the storage area is configured to be copied before writing to the storage area may include determining that the storage area falls within a snapshot. Additionally or alternatively, determining that the storage area is configured to be copied before writing to the storage area may include determining that the storage area includes deduplicated data.

In some embodiments, the interface may include an interface between the storage system and a mapping layer that maps logical data locations to physical data locations on the storage system. Additionally or alternatively, the interface may include an interface between the storage system and (1) a file system and/or (2) a database.

In some examples, using the interface may include (1) specifying to the storage system an offset of the write operation within the storage area and (2) passing a buffer including the content of the write operation to the storage system. Additionally or alternatively, using the interface may include (1) specifying the storage system a location of the storage area, (2) specifying to the storage system a target location at which to create the copy of the storage area modified with the write operation, (3) specifying to the storage area a size of the storage area, (4) specifying to the storage system an offset of the write operation within the storage area, and (5) passing a buffer including a content of the write operation to the storage system. In some embodiments, using the interface may include instructing the storage system to create a copy of the storage area modified with the write operation without passing data within the storage area from the storage system to the mapping layer.

In one embodiment, a system for implementing the above-described method may include (1) an identification module programmed to identify a write operation addressed to at least a part of a storage area on a storage system, (2) a determination module programmed to determine that the storage area is configured to be copied before writing to the storage area in order to preserve original data stored within the storage area, (3) an interface module programmed to identify an interface for offloading copy-on-write operations to the storage system, and (4) an instruction module programmed to use the interface to instruct the storage system to create a copy of the storage area modified with the write operation. The system may also include at least one processor configured to execute the identification module, the determination module, the interface module, and the instruction module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a write operation addressed to at least a part of a storage area on a storage system, (2) determine that the storage area is configured to be copied before writing to the storage area in order to preserve original data stored within the storage area, (3) identify an interface for offloading copy-on-write operations to the storage system, and (4) use the interface to instruct the storage system to create a copy of the storage area modified with the write operation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
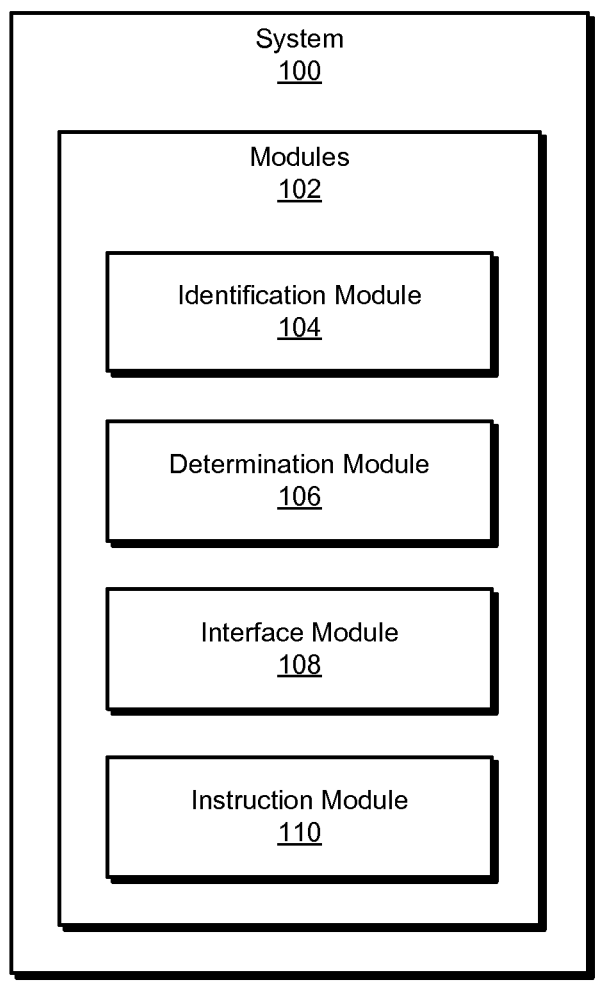
FIG. 1 is a block diagram of an exemplary system for performing copy-on-write operations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing copy-on-write operations. As will be explained in greater detail below, by offloading copy-on-write operations to storage systems (e.g., with native capacities to perform copy-on-write operations) through copy-on-write interfaces, the systems and methods described herein may significantly reduce the I/O burden on systems originating write requests and/or may increase the speed of completing transactions involving copy-on-write operations.

Figure 2:
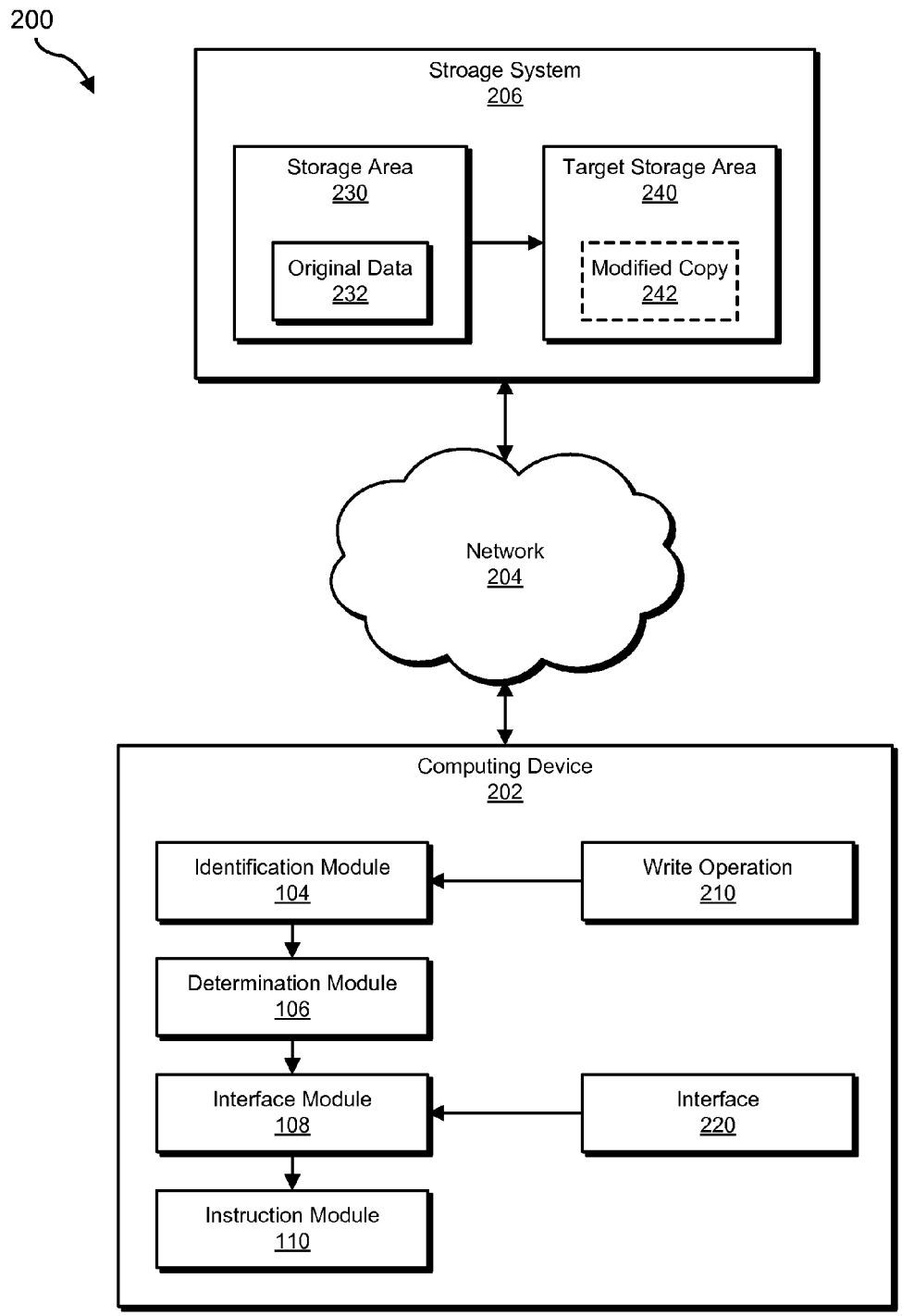
FIG. 2 is a block diagram of an exemplary system for performing copy-on-write operations.
Figure 3:
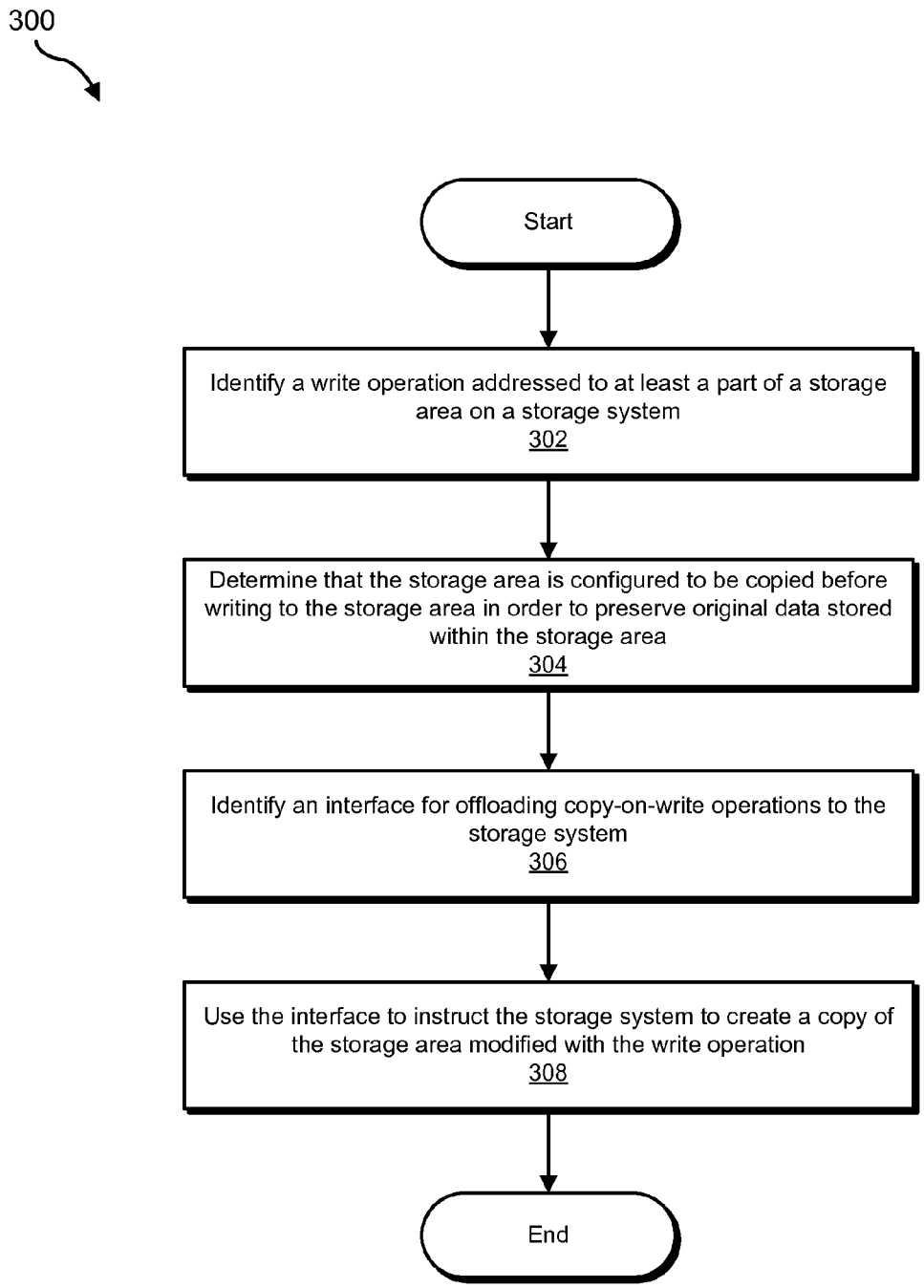
FIG. 3 is a flow diagram of an exemplary method for performing copy-on-write operations.
Figure 4:
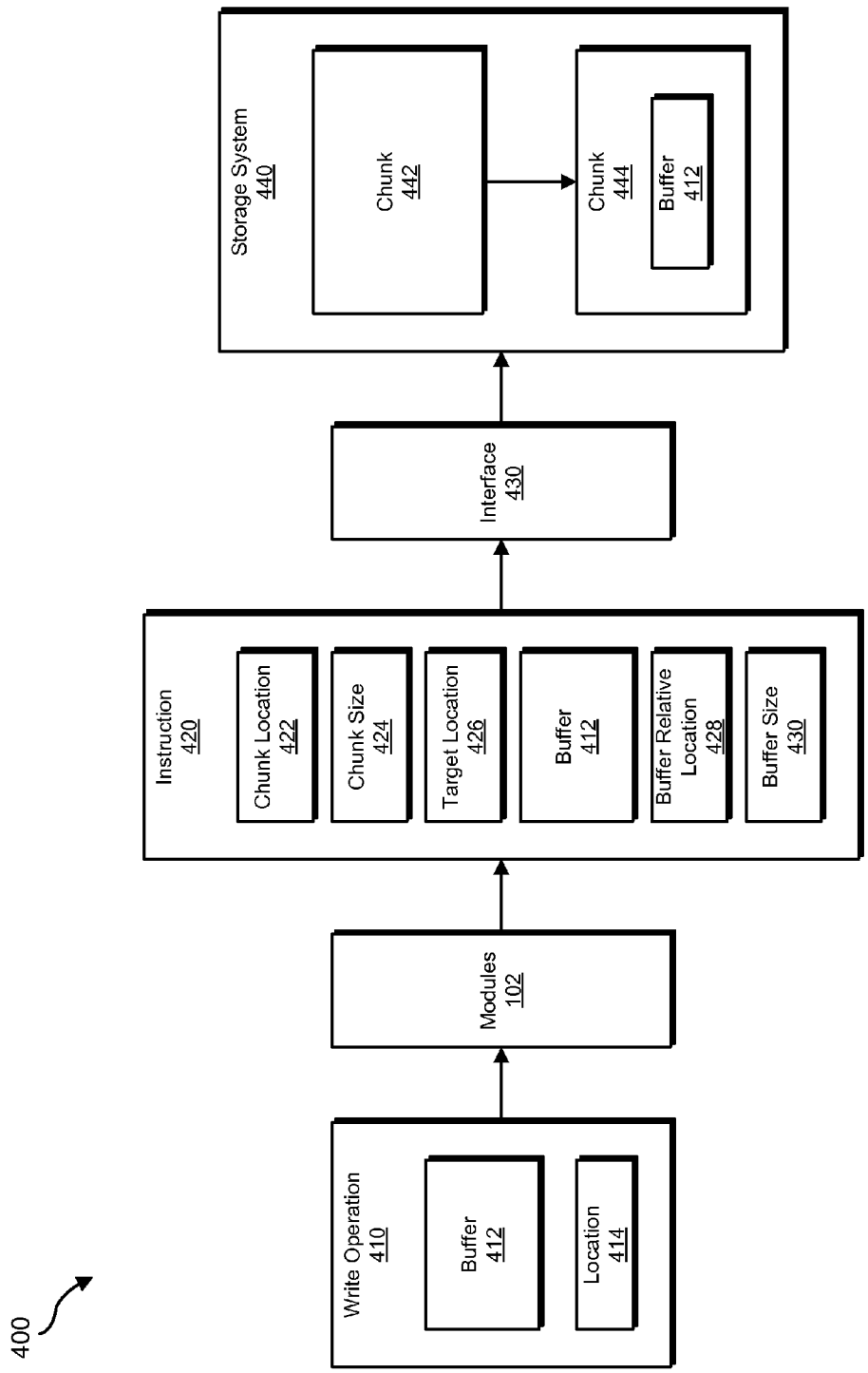
FIG. 4 is a block diagram of an exemplary system for performing copy-on-write operations.

The following will provide, with reference to FIGS. 1, 2, and 4, detailed descriptions of exemplary systems for performing copy-on-write operations. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing copy-on-write operations. As illustrated in this figure, exemplary system 100 may include one or more modules 102 for performing one or more tasks. For example, and as will be explained in greater detail below, exemplary system 100 may include an identification module 104 programmed to identify a write operation addressed to at least a part of a storage area on a storage system. Exemplary system 100 may also include a determination module 106 programmed to determine that the storage area is configured to be copied before writing to the storage area in order to preserve original data stored within the storage area.

In addition, and as will be described in greater detail below, exemplary system 100 may include an interface module 108 programmed to identify an interface for offloading copy-on-write operations to the storage system. Exemplary system 100 may also include an instruction module 110 programmed to use the interface to instruct the storage system to create a copy of the storage area modified with the write operation. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or storage system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a storage system 206 via a network 204. Computing device 202 may be programmed with one or more of modules 102. Additionally or alternatively, storage system 206 may be programmed with one or more of modules 102.

In one embodiment, one or more of modules 102 from FIG. 1 may, when executed by at least one processor of computing device 202 and/or storage system 206, facilitate computing device 202 and/or storage system 206 in performing copy-on-write operations. For example, and as will be described in greater detail below, one or more of modules 102 may cause computing device 202 and/or storage system 206 to (1) identify a write operation 210 addressed to at least a part of a storage area 230 on storage system 206, (2) determine that storage area 230 is configured to be copied before writing to the storage area 230 in order to preserve original data 232 stored within storage area 230, (3) identify an interface 220 for offloading copy-on-write operations to storage system 206, and (4) use interface 220 to instruct storage system 206 to create a copy of storage area 240 modified with write operation 210 (e.g., to create a modified copy 242 of original data 232 at a target storage area 240).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. Examples of computing device 202 include, without limitation, application servers and database servers configured to provide various database services and/or run certain software applications.

Storage system 206 generally represents any type or form of computing device and/or devices capable of storing data. Storage system 206 may represent portions of a single storage device or a plurality of storage devices. In some examples, storage system 206 may represent a portion of computing system 510 in FIG. 5 and/or portions of exemplary network architecture 600 in FIG. 6. In some examples, storage system 206 may represent one or more physically separate devices capable of being accessed by a computing device, such as computing system 510 in FIG. 5 and/or portions of exemplary network architecture 600 in FIG. 6. In one example, storage system 206 may represent a storage array.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and storage system 206.

FIG. 3 is a flow diagram of an exemplary computer-implemented method 300 for performing copy-on-write operations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a write operation addressed to at least a part of a storage area on a storage system. For example, at step 302 identification module 104 may, as part of computing device 202 in FIG. 2, identify write operation 210 addressed to at least a part of storage area 230 on storage system 206.

As used herein, the phrase "write operation" may refer to any command, attempt, and/or instruction to write to a storage system. For example, the phrase "write operation" may refer to an operation to write to one or more file system blocks.

Identification module 104 may identify the write operation in any of a variety of contexts. For example, identification module 104 may identify the write operation by intercepting the write operation as a part of a file system filter driver. In some examples, identification module 104 may identify the write operation by receiving a message from a snapshot system and/or a deduplication system identifying the write operation.

As used herein, the phrase "storage area" may refer to any area, region, and/or chunk of storage space on the storage system. In some examples, the storage area may be larger than the size of the write operation. For example, the storage area may correspond to a copy-on-write chunk. In this example, when any part of the copy-on-write chunk is to be modified, the whole copy-on-write chunk may be the subject of a copy-on-write operation. For example, the write operation may apply to a single four-kilobyte block within a one-megabyte chunk. As will be explained in greater detail below, the systems and methods described herein may offload a copy-on-write operation performed on the storage area to the storage system.

As used herein, the phrase "storage system" may refer to any storage device and/or collection of storage devices for storing data. As an example, the phrase "storage system" may refer to a storage array. In some examples, the storage system may be configured to perform one or more functions on the storage system directly (e.g., copying data, transferring data, reading and/or writing data, etc.) that do not involve transferring data from the storage system to a separate system. For example, as will be explained in greater detail below, the storage system may expose an interface for writing a modified version of data from one location on the storage system to another location on the storage system.

FIG. 4 illustrates an exemplary system 400 for performing copy-on-write operations. As shown in FIG. 4, exemplary system 400 may include modules 102 and a storage system 400. Using FIG. 4 as an example, at step 302 identification module 104 may identify a write operation 410 directed to a location within a chunk 442 on storage system 440.

Returning to FIG. 3, at step 304 one or more of the systems described herein may determine that the storage area is configured to be copied before writing to the storage area in order to preserve original data stored within the storage area. For example, at step 304 determination module 106 may, as part of computing device 202 in FIG. 2, determine that storage area 230 is configured to be copied before writing to the storage area 230 in order to preserve original data 232 stored within storage area 230.

Determination module 106 may determine that the storage area is configured to be copied in any of a variety of contexts. For example, determination module 106 may determine that the storage area falls within a snapshot. As used herein, the term "snapshot" may refer to any representation of a volume of data and/or a portion of a volume in a certain state and/or point in time. In some examples, a "snapshot" may refer to a space-saving snapshot (e.g., a snapshot that references a primary volume for unchanged data) and/or a copy-on-write snapshot (e.g., a snapshot that copies protected data as it existed at the time of the snapshot before overwriting the protected data in order to preserve a point-in-time copy of the data). Accordingly, determination module 106 may determine that the storage area falls within the scope and the volume subject to the snapshot (and, e.g., that the storage area has not yet been written to since the time of the snapshot).

In some examples, determination module 106 may determine that the storage area includes deduplicated data. As used herein, the term "deduplication" may refer to one or more operations related to reducing the amount of storage space used in a data storage system, including operations for detecting and preventing data from being redundantly stored within a storage system. For example, data deduplication may reduce the amount of storage space used in a data storage system by detecting and removing redundant copies of data in the data storage system (and, e.g., replacing the redundant copies with references to a single copy). In some examples, a deduplicated data system may reduce the amount of space required to store similar files by dividing the files into chunks and storing only unique chunks. In this example, each deduplicated file may simply consist of a list of chunks that make up the file. For example, a deduplication system may store a single instance of the chunks of a file on behalf of multiple users instead of a separate copy of the file for each user. If one user attempts to modify the file, the deduplication system may apply a copy-on-write operation to the deduplicated chunk of the file to be modified to preserve the file in its original form for the remaining users. The instance of the file owned by the user may then refer to the modified chunk (e.g., copied from the original deduplicated chunk and modified with the write operation) instead of the original deduplicated chunk. As another example, multiple virtual machines may store redundant data, and this redundant data may be deduplicated across the virtual machines. Accordingly, a hypervisor managing the virtual machines may determine that one or more regions of the corresponding virtual machine disk files are configured for copy-on-write operations.

Using FIG. 4 as an example, at step 304 determination module 106 may determine that chunk 442 is configured to be copied before any write operation is applied to the data within chunk 442. For example, chunk 442 may fall within a snapshot.

Returning to FIG. 3, at step 306 one or more of the systems described herein may identify an interface for offloading copy-on-write operations to the storage system. For example, at step 306 interface module 108 may, as part of computing device 202 in FIG. 2, identify interface 220 for offloading copy-on-write operations to storage system 206.

As used herein, the phrase "copy-on-write operation" may refer to any operation for creating a copy of stored data before modifying the stored data. In some examples, the phrase "copy-on-write operation" may refer to copying original data to a new location and modifying the data at the new location (e.g., while preserving the original data at the original location). Additionally or alternatively, the phrase "copy-on-write operation" may refer to may refer to copying original data to a new location and modifying the data at the original location (e.g., thereby preserving the data at the new location).

The interface may include any suitable interface for offloading copy-on-write operations (e.g., including the initiating write operation). In some examples, the interface may include an interface between the storage system and a mapping layer that maps logical data locations to physical data locations on the storage system. For example, the interface may include a file system (e.g., that uses block storage based on a block device representing storage space on the storage system). Additionally or alternatively, the interface may include a database (e.g., that stores data directly to the storage system). Generally, the interface may include an interface the storage system and any system providing and/or using a higher-level storage abstraction. For example, the interface may include an application programming interface (e.g., for use by a backup system, a deduplication system, a virtualization system, etc.). Additionally or alternatively, the interface may include a system call. In some examples, the interface may include an interface exposed by the storage system and/or a copy manager of the storage system.

Using FIG. 4 as an example, at step 306 interface module 108 may identify an interface 430 for offloading copy-on-write operations to storage system 440.

Returning to FIG. 3, at step 308 one or more of the systems described herein may use the interface to instruct the storage system to create a copy of the storage area modified with the write operation. For example, at step 308 instruction module 110 may, as part of computing device 202 in FIG. 2, use interface 220 to instruct storage system 206 to create a copy of storage area 240 modified with write operation 210 (e.g., to create modified copy 242 of original data 232 at a target storage area 240).

In some examples, instruction module 110 may instruct the storage system to create the modified copy of the storage area by passing a set of parameters to the storage system specifying information about the copy-on-write operation (e.g., including the write operation). For example, instruction module 110 may use the interface by (1) specifying to the storage system an offset of the write operation within the storage area and (2) passing a buffer including the content of the write operation to the storage system.

In some examples, instruction module 110 may use the interface by (1) specifying the storage system a location of the storage area, (2) specifying to the storage system a target location at which to create the copy of the storage area modified with the write operation, (3) specifying to the storage area a size of the storage area, (4) specifying to the storage system an offset of the write operation within the storage area, and (5) passing a buffer including a content of the write operation to the storage system. In one example, an application may use the interface by performing a call defined as "COPY-AND-WRITE (copy-src-offset, copy-tgt-offset, copy-size, write-buf.addr, write-buf.sub-reg-offset, write-buf.size)". In this example, "copy-src-offset" may specify a location of the storage area (e.g., copy-on-write chunk), "copy-tgt-offset" may specify a target location of the copy-on-write operation (e.g., space the size of the copy-on-write chunk allocated before the COPY-AND-WRITE call), "copy-size" may specify the copy-on-write chunk size, "write-buf.addr" may specify the buffer including the content of the write operation that precipitated the copy-on-write operation, "write-buf.sub-reg-offset" may specify the relative target location of the write operation within the copy-on-write chunk, and "write-buf.size" may specify the size of the write operation.

In some examples, instruction module 110 may use the interface by instructing the storage system to create a copy of the storage area modified with the write operation without passing data within the storage area from the storage system to the mapping layer. Using FIG. 2 as an example, instruction module 110 may instruct storage system to store a copy of storage area 230 modified with write operation 210 to target storage area 240 without transmitting original data 232 from storage system 206 to computing device 202 or modified copy 242 from computing system 202 to storage system 206.

Using FIG. 4 as an example, instruction module 110 may send an instruction 420 to storage system 440 via interface 430. As shown in FIG. 4, instruction 420 may include a chunk location of chunk 442, a chunk size of chunk 442, a target location of chunk 444, a buffer 412 including the content of write operation 410, a buffer relative location 428 specifying a relative target location of write operation 410 within chunk 442, and a buffer size 430 of buffer 412. Storage system 440 may then create a copy of chunk 442 at chunk 444 modified with buffer 412 at buffer relative location 428 within chunk 444.

In some examples, after the storage system successfully completes the copy-on-write operation, the storage system may notify a system maintaining copy-on-write information (e.g., a deduplication system and/or backup system defining which chunks of the storage system require a copy-on-write). The system managing copy-on-write information may then update a logical map to indicate that the copy-on-write chunk does not require a subsequent copy-on-write operation.

As an example, a write operation may include 4 kilobytes of data at an offset of 16 kilobytes on a storage device. In this example, the minimum copy-on-write chunk size of a system using copy-on-write operations may be 1 megabyte. Accordingly, a traditional copy-on-write system may read 1 megabyte of data starting from offset 0 into a buffer, modify the buffer with the 4 kilobytes of data at offset 16 k within the buffer, allocate a 1 megabyte chunk on the storage device, and write the modified buffer to the allocated chunk. Accordingly, the traditional copy-on-write system may involve 2 megabytes of I/O in response to a 4 kilobyte write operation. However, the systems and methods described herein may instead transmit a 4 kilobyte buffer to the storage device in addition to parameters of a negligible size specifying to the storage device information for performing the copy-on-write operation (e.g., with the write operation).

As explained above, by offloading copy-on-write operations to storage systems (e.g., with native capacities to perform copy-on-write operations) through copy-on-write interfaces, the systems and methods described herein may significantly reduce the I/O burden on systems originating write requests and/or may increase the speed of completing transactions involving copy-on-write operations.

For example, a data chunk on a storage system that is deduplicated and/or protected by a snapshot may require a copy-on-write operation. When a write attempt is directed to a portion of the data chunk, instead of reading the data chunk from the storage system, modifying the data chunk with the write operation, and writing the modified data chunk to a new location on the storage system, the systems and methods described herein may send information locating the data chunk within the storage system and providing a data buffer with the content of the write operation (e.g., along with a relative target location of the write operation within the data chunk, a location of allocated space on the storage system that is the size of the data chunk, information specifying the size of the data chunk, information specifying the size of the data buffer, etc.) to the storage system. The storage system may then read from the data chunk and write the data chunk, modified with the data buffer, to a new location on the storage system. By offloading these operations instead of involving an originating server and/or application in reading from the data chunk and writing the data chunk to the storage system, the systems and methods described herein may reduce the resource load on the originating server and/or application, may reduce the latency of the write operation, and/or may reduce SAN bandwidth consumption.

Figure 5:
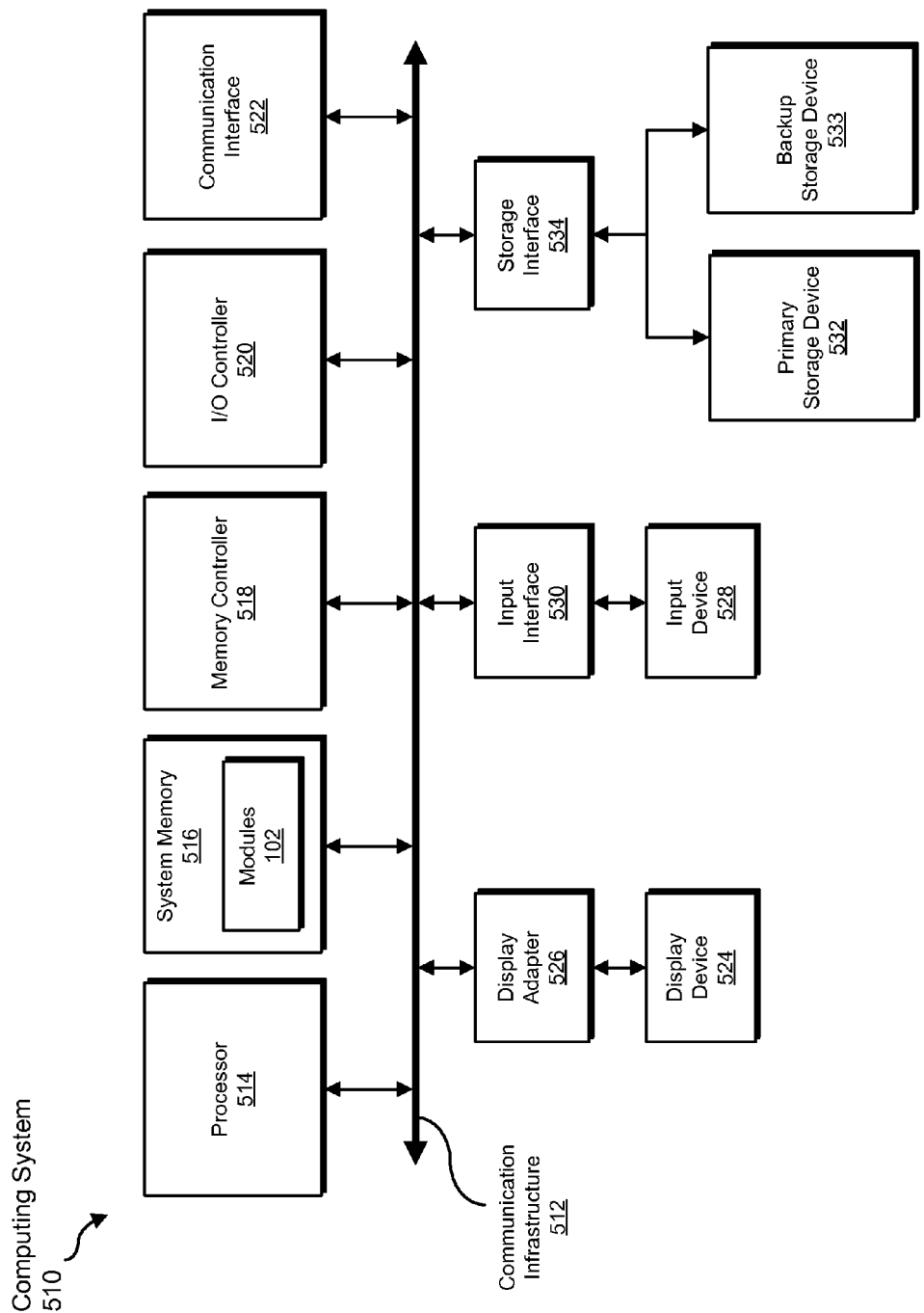
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, using, instructing, specifying, and passing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
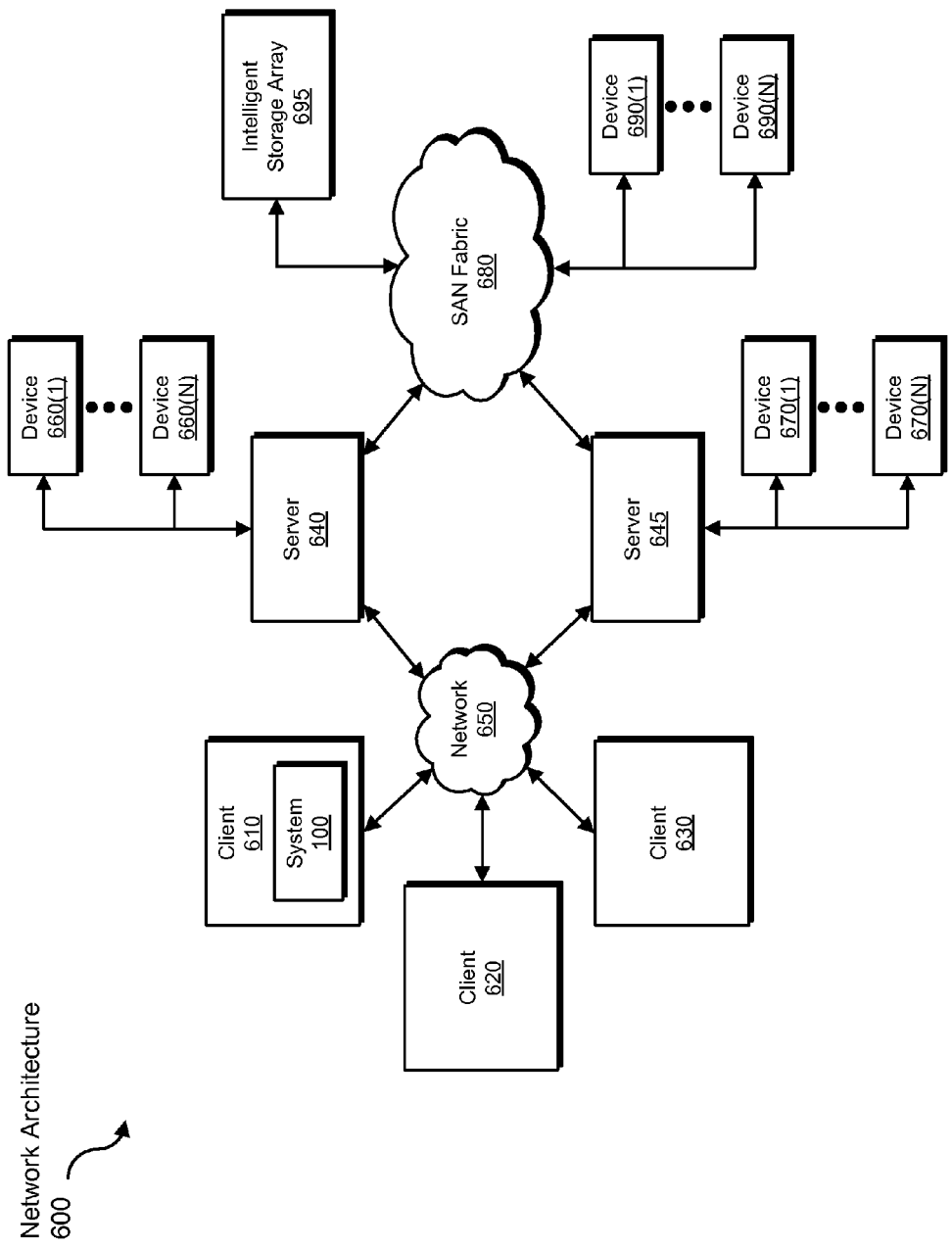
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, using, instructing, specifying, and passing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for performing copy-on-write operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a write operation to be transformed, transform the write operation into an instruction for a copy-on-write interface to a storage system, output the result of the transformation to the storage system, use the result of the transformation to offload a copy-on-write operation to the storage system, and store the result of the copy-on-write operation to the storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing copy-on-write operations, at least a portion of the method being performed by a computing device comprising at least one processor, the method comprising:
    identifying a write operation addressed to at least a part of a storage area on a storage system, the write operation comprising a block-level write operation;
    determining that the storage area falls within a snapshot and that, therefore, the entire storage area is configured to be copied as a chunk before writing to the storage area in order to preserve original data stored within the storage area, wherein a chunk size encompassing the entire storage area is larger than a size of the block-level write operation;
    identifying an interface for offloading copy-on-write operations to the storage system;
    using the interface, in response to identifying the block-level write operation, to instruct the storage system to create a copy of the storage area before the storage area is modified with the write operation.

2. The computer-implemented method of claim 1, wherein using the interface comprises:
    specifying to the storage system an offset of the write operation within the storage area;
    passing a buffer comprising a content of the write operation to the storage system.

3. The computer-implemented method of claim 1, wherein using the interface comprises:
    specifying to the storage system a location of the storage area;
    specifying to the storage system a target location at which to create the copy of the storage area modified with the write operation;
    specifying to the storage area a size of the storage area;
    specifying to the storage system an offset of the write operation within the storage area;
    passing a buffer comprising a content of the write operation to the storage system.

4. The computer-implemented method of claim 1, wherein the interface comprises an interface between the storage system and a mapping layer that maps logical data locations to physical data locations on the storage system.

5. The computer-implemented method of claim 4, wherein using the interface comprises instructing the storage system to create the copy of the storage area modified with the write operation without passing data within the storage area from the storage system to the mapping layer.

6. The computer-implemented method of claim 1, wherein the interface comprises an interface between the storage system and at least one of:
    a file system;
    a database.

7. The computer-implemented method of claim 1, wherein determining that the storage area is configured to be copied before writing to the storage area in order to preserve original data stored within the storage area comprises determining that the storage area comprises deduplicated data.

8. A system for performing copy-on-write operations, the system comprising:
    an identification module programmed to identify a write operation addressed to at least a part of a storage area on a storage system, the write operation comprising a block-level write operation;
    a determination module programmed to determine that the storage area falls within a snapshot and that, therefore, the entire storage area is configured to be copied as a chunk before writing to the storage area in order to preserve original data stored within the storage area, wherein a chunk size encompassing the entire storage area is larger than a size of the block-level write operation;
    an interface module programmed to identify an interface for offloading copy-on-write operations to the storage system;
    an instruction module programmed to use the interface, in response to identifying the block-level write operation, to instruct the storage system to create a copy of the storage area before the storage area is modified with the write operation;
    at least one processor configured to execute the identification module, the determination module, the interface module, and the instruction module.

9. The system of claim 8, wherein the instruction module is programmed to use the interface by:
    specifying to the storage system an offset of the write operation within the storage area;
    passing a buffer comprising a content of the write operation to the storage system.

10. The system of claim 8, wherein the instruction module is programmed to use the interface by:
    specifying to the storage system a location of the storage area;
    specifying to the storage system a target location at which to create the copy of the storage area modified with the write operation;
    specifying to the storage area a size of the storage area;
    specifying to the storage system an offset of the write operation within the storage area;
    passing a buffer comprising a content of the write operation to the storage system.

11. The system of claim 8, wherein the interface comprises an interface between the storage system and a mapping layer that maps logical data locations to physical data locations on the storage system.

12. The system of claim 11, wherein using the interface comprises instructing the storage system to create the copy of the storage area modified with the write operation without passing data within the storage area from the storage system to the mapping layer.

13. The system of claim 8, wherein the interface comprises an interface between the storage system and at least one of:
    a file system;
    a database.

14. The system of claim 8, wherein the determination module is programmed to determine that the storage area is configured to be copied before writing to the storage area in order to preserve original data stored within the storage area by determining that the storage area comprises deduplicated data.

15. A non-transitory computer-readable medium comprising one or more computer-executable instructions that, when executed by at least one processor of a computing device, cause the computing device to:
- identify a write operation addressed to at least a part of a storage area on a storage system, the write operation comprising a block-level write operation;
- determine that the storage area falls within a snapshot and that, therefore, the entire storage area is configured to be copied as a chunk before writing to the storage area in order to preserve original data stored within the storage area, wherein a chunk size encompassing the entire storage area is larger than a size of the block-level write operation;
- identify an interface for offloading copy-on-write operations to the storage system;
- use the interface, in response to identifying the block-level write operation, to instruct the storage system to create a copy of the storage area before the storage area is modified with the write operation.

16. The non-transitory computer-readable medium of claim 15, wherein the one or more computer-executable instructions cause the computing device to use the interface by causing the computing device to:
- specify to the storage system an offset of the write operation within the storage area;
- pass a buffer comprising a content of the write operation to the storage system.

17. The non-transitory computer-readable medium of claim 15, wherein using the interface comprises:
- specifying to the storage system a location of the storage area;
- specifying to the storage system a target location at which to create the copy of the storage area modified with the write operation;
- specifying to the storage area a size of the storage area;
- specifying to the storage system an offset of the write operation within the storage area;
- passing a buffer comprising a content of the write operation to the storage system.

18. The non-transitory computer-readable medium of claim 15, wherein the interface comprises an interface between the storage system and a mapping layer that maps logical data locations to physical data locations on the storage system.

19. The non-transitory computer-readable medium of claim 18, wherein using the interface comprises instructing the storage system to create the copy of the storage area modified with the write operation without passing data within the storage area from the storage system to the mapping layer.

20. The computer-implemented method of claim 1, wherein:
- the size of the block-level write operation corresponds to a block size of the block-level write operation.

* * * * *